Nov. 20, 1934.　　　R. B. FAGEOL　　　1,981,449
MULTI-WHEEL ROAD VEHICLE
Filed March 18, 1929　　　2 Sheets-Sheet 1
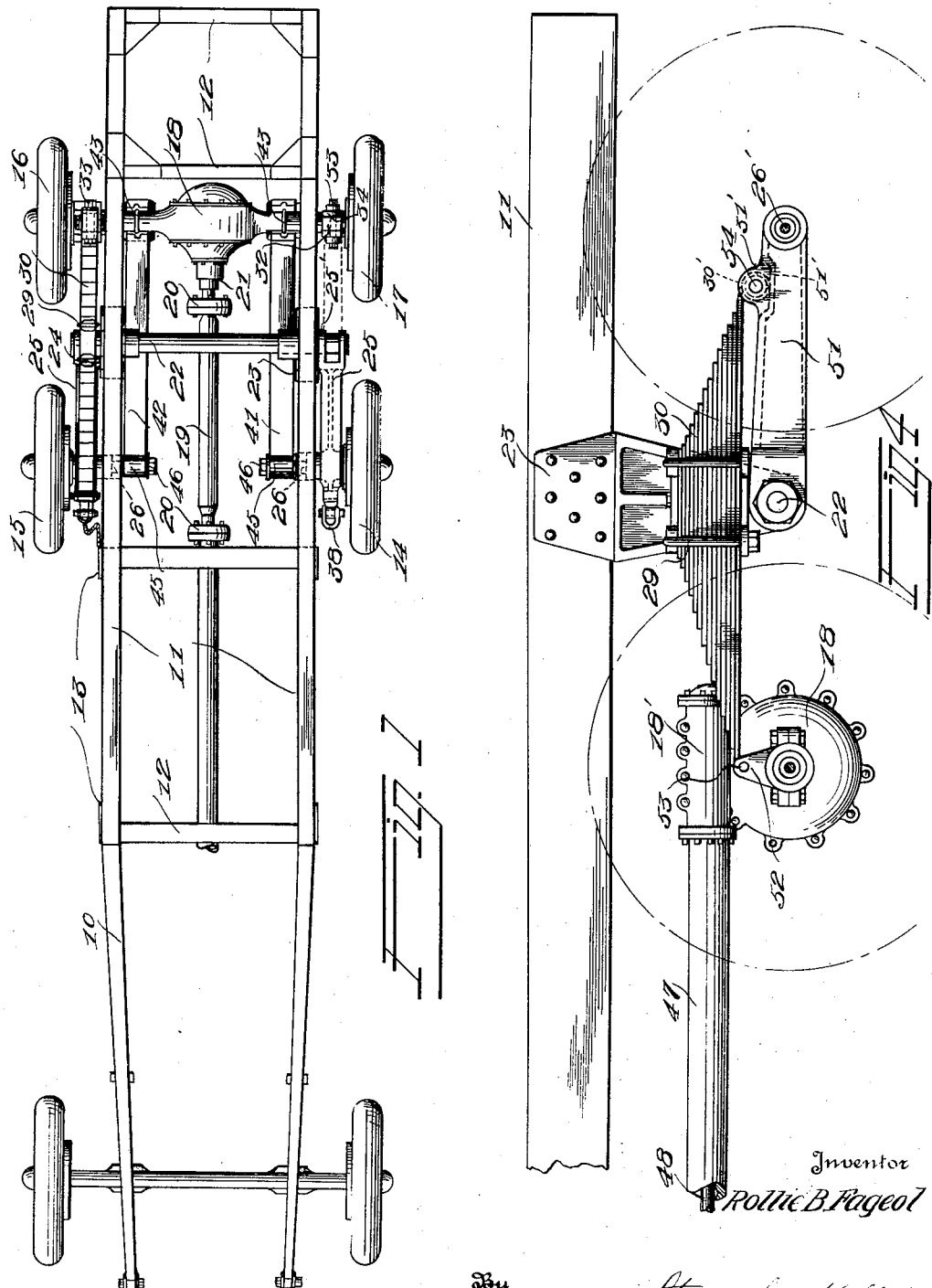

Nov. 20, 1934.　　　　R. B. FAGEOL　　　　1,981,449
MULTI-WHEEL ROAD VEHICLE
Filed March 18, 1929　　　2 Sheets-Sheet 2
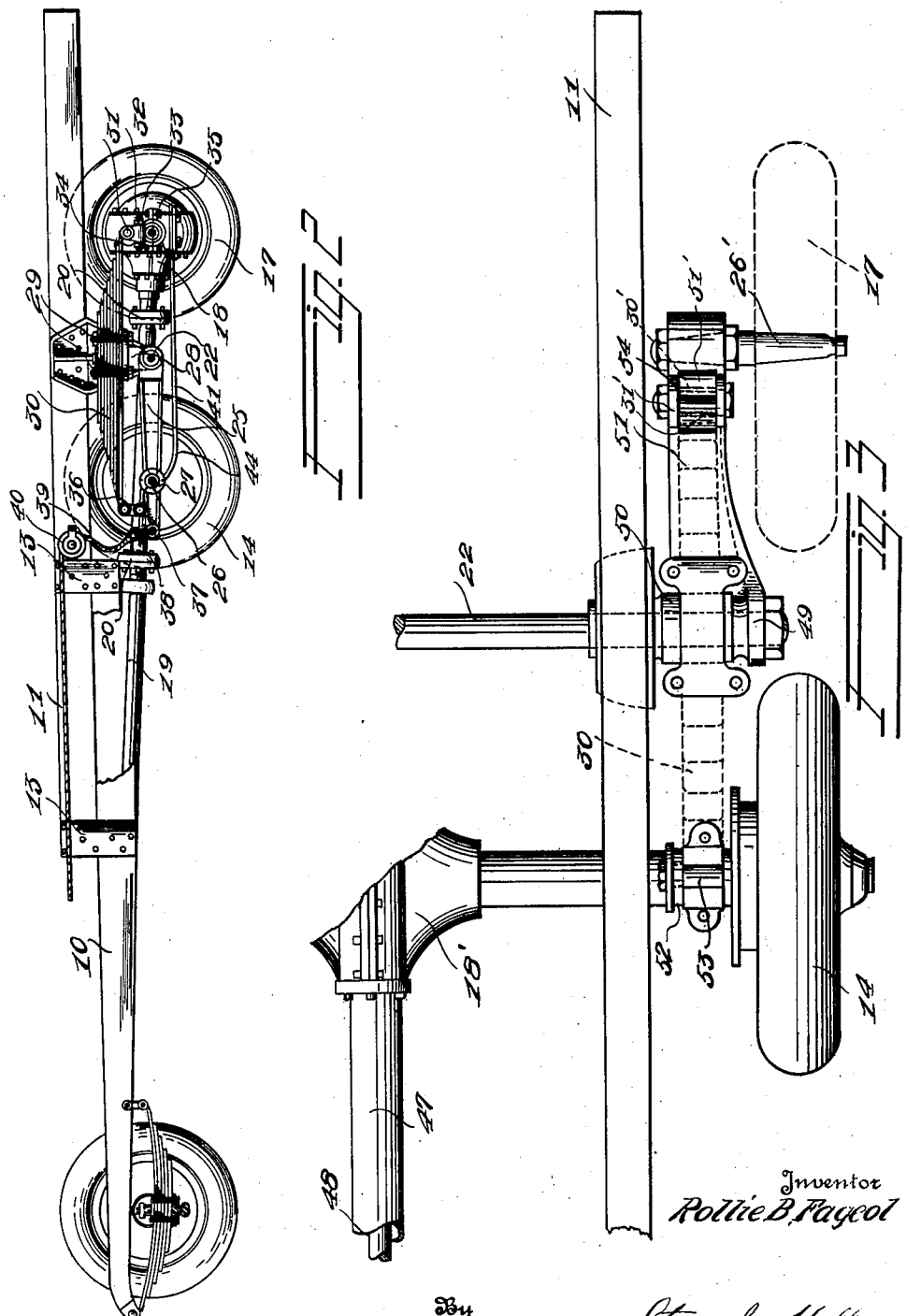

Patented Nov. 20, 1934

1,981,449

UNITED STATES PATENT OFFICE 1,981,449

MULTI-WHEEL ROAD VEHICLE

Rollie B. Fageol, Los Angeles, Calif., assignor, by mesne assignments, to Automotive Engineering Corporation, a corporation of Delaware Application March 18, 1929, Serial No. 348,069

3 Claims. (Cl. 180—22)

This invention relates to multi-wheel road vehicles of the type that are constructed from an ordinary vehicle having only a single drive axle by the addition thereto of an extension frame and additional wheels, though the invention is capable of application to new constructions.

This invention aims to provide a thoroughly practical multi-wheel road vehicle construction, that may be produced by simply adding relatively few and simple parts to a two axle vehicle of standard construction to convert the standard vehicle into a vehicle one end of which is supported by a truck consisting of four wheels. It is extremely desirable in converting an ordinary vehicle of the motor driven type, into a motor driven vehicle having a multiplicity of wheels supporting the rear end, that a construction be provided that may utilize as many as possible of the standard parts that enter into the construction of the ordinary vehicle and to design the construction so that the added parts are of relative simplicity and few in number, without thereby in any manner sacrificing the advantages that are secured by a properly constructed multi-wheel road vehicle.

Multi-wheel road vehicles have been heretofore proposed in which each of the wheels is secured to one end of an axle and in which the axles are connected together by springs that are pivoted to the frame for swinging movement on a transverse axis so that the construction provides, in effect, a truck, supporting one end of the frame, that is free to oscillate about said pivot as the vehicle moves over road irregularities. In view of the fact that the wheels of the truck, in such constructions, are each connected to a wheel at the opposite side of the frame by an axle that extends across and beneath the frame, when a wheel at one side of the frame engages a depression or elevation in the road, its freedom to rise and fall in following said elevations or depressions is restricted by virtue of the fact that it is connected to said axle and to the other wheel. Furthermore, when a wheel in such a construction does rise and fall under the conditions just stated, the connections by which it is attached to the frame are subjected to twisting forces, due to the fact that the axle to which the wheel is connected is not free to maintain a position parallel to its normal position in all of the abnormal positions that it must assume in the actual operation of the vehicle.

The primary object of this invention is to provide a multi-wheel road vehicle construction in which a plurality of pairs of wheels are utilized to support one end of the frame, in which the wheels are connected together and to the frame in such a way as to provide a truck construction free to pivot about a trunnion extending transversely of the frame, when the truck oscillates in moving over road irregularities, but in which the wheels are connected together in such a way that certain of the wheels on one side of the vehicle can rise and fall in moving over road irregularities without in any manner affecting the oppositely disposed wheel on the other side of the vehicle frame, and without imposing substantial twisting stresses upon the connection between the wheel and the mechanism that connects it to the frame.

A still further object of the invention is to provide a multi-wheel road vehicle construction, including a plurality of pairs of wheels that are interconnected together to form a truck construction that is free to oscillate about a trunnion secured to the frame and extending transversely thereof, which may be constructed from a standard motor vehicle by the addition thereto of relatively few simple parts connected together in such a way as to provide a truck construction having a very high degree of flexibility.

A still further object of the invention is to provide a multi-wheel road vehicle including a flexible truck construction, arranged for pivotal movement about a single transverse trunnion shaft, in which only one pair of wheels is connected by a drive axle while the other pair is free to rise and fall with respect to each other and in which said other pair of wheels are positively guided about the axis of said shaft independently of the springs that resiliently resist their movement about the axis of said trunnion shaft.

A still further object of the invention is to provide a multi-wheel road vehicle embodying a four wheel truck to support one end of the frame thereof, two of said four wheels being wheels supporting and driven by an interconnecting axle, in which the torque reactions are resisted by a spring arm that does not substantially restrict the flexibility of the truck and by which said reactions are transferred from the housing of said axle to other wheels of the truck, that are not positively driven, in such a manner as to tend to lift said wheels from the ground whereby under severe driving conditions the torque reactions tend to lift said wheels from the ground causing the load to be shifted to the driven wheels, thereby increasing the traction of said wheels.

A still further object of the invention is to provide a multi-wheel road vehicle construction including a plurality of pairs of wheels only one pair of which is driven, and in which means are provided to lift the non-driven wheels from the ground so that the load may be shifted to the driven wheels manually in case of loss of traction by the driven wheels.

A still further object of the invention is to provide a multi-wheel road vehicle construction, embodying a truck composed of four wheels to support the rear end thereof, which four wheels are each capable of moving with respect to the frame about an axis extending transversely of the frame and in which a pair of said four wheels are independently movable with respect to every other wheel of the truck without affecting any of the other wheels thereof.

Still further objects of the invention will appear as a description thereof proceeds with reference to the accompanying drawings in which, Figure 1 is a plan view of a road vehicle constructed in accordance with this invention, one of the springs which connect the wheels on one side of the frame to the frame being omitted for clearness.

Figure 2 is a longitudinal sectional view taken on a plane cutting the axles immediately adjacent the wheels on one side thereof.

Figure 3 is a fragmentary plan view of a modified form of the invention.

Figure 4 is a diagrammatic sectional view, corresponding to Figure 2, of the modified form of the invention appearing in Figure 3.

Like reference characters indicate like parts throughout the several figures.

The novel vehicle construction, about to be described, is particularly intended to be fabricated from an ordinary road vehicle of the motor driven type, in which the rear end thereof is supported on a single axle carried by a single pair of wheels. Standard vehicles of the type just referred to may be readily converted into multi-wheel road vehicles with their attendant advantages by the addition of relatively few simple parts about to be described. It should be understood however, that the invention may be embodied in a vehicle that is constructed de novo, rather than by simply converting a standard construction or adding an attachment to such a structure.

In the drawings, the numeral 10 indicates the chassis frame of an ordinary standard vehicle which is to be converted in the manner presently to be described into a multi-wheel road vehicle having a longer wheel base. The longer wheel base is preferably secured by attaching to the frame 10 of the vehicle, an extension frame including longitudinal members 11 and transverse members 12, the frame formed by the members 11 and 12 being secured in overlapped relation to the frame 10 by any suitable means, as by metal straps 13 that are secured to the longitudinal members 10 and 11 respectively, as clearly shown in Figure 2 of the drawings. This construction provides an extended chassis frame in which the rear end thereof is offset with respect to the longitudinal members 10 providing room in which the truck construction about to be described may freely oscillate as the vehicle moves over uneven roads.

One end of the frame just described is supported by a forwardly disposed axle in the usual manner, while the other end, as illustrated, is supported by a truck construction, consisting of two pairs of wheels designated by the numerals 14, 15, 16 and 17. Wheels 16 and 17 support a drive axle housing 18 extending transversely of the frame, housing 18 containing the usual differential and live axle sections coupled operatively with the wheels 16 and 17. Said axle sections are differentially driven by a drive shaft 19 extending longitudinally of the frame in well known manner, said drive shaft being provided with a plurality of universal joints 20 and a slip joint 21 permitting the axle housing 18 to rise and fall and tilt as the wheels that support it move over road irregularities. The wheels 14, 15, 16 and 17 are connected to the frame in such manner that each wheel can move bodily with respect to the axis of a shaft that extends transversely of the frame, the wheels being, with this end in view, connected to a trunnion or shaft 22 extending transversely across the frame. Said shaft is supported in brackets 23 and 24, secured to the exterior of the sides of the frame 11, and depending from said frame to bring the axis of said shaft or trunnion substantially in the horizontal plane that contains the axes of rotation of all of the wheels under normal load conditions, as clearly shown in Figure 2. The ends of the shaft 22, it will be observed, extend beyond the sides of the extension member 11.

Journalled on each end of said trunnion shaft 22 is an arm 25 having a bifurcated end 25' through which end the trunnion shaft extends. Suitably fixed as by a pressed tapered fit in each arm 25 is a stub axle 26, these axles extending in opposite directions transversely of the frame from the sides of the arms. The wheel 14 is secured to one of said stub axles on the outside of arm 25, while the wheel 15 is secured to the stub axle carried by the arm on the opposite side of said frame, externally of said arm, as clearly shown in Figure 1. The brake assembly for the wheels 14 and 15 is connected to the arms 25, if these wheels are provided with a brake mechanism, suitable brake mounting means shown at 27 (Figure 2) being provided on each arm for this purpose.

Preferably the stub axle 26 is fixed in the arm 25 some distance from the forward end thereof, but it will be understood, that if desired, the stub axle 26 may be fixed at the forward end of said arm, as may be deemed most advantageous under existing conditions. In the form of the invention illustrated in Figures 1 and 2, the stub axles are fixed short of the end of the arm in order to utilize a longer spring arm to yieldingly resist the independent swinging movement of the wheels 14 and 15 with respect to the trunnion axis 22, this result being accomplished in a manner presently to be described.

Journalled on the trunnion or shaft 22 adjacent each end thereof, between the arms of the bifurcation 25' on the rear end of each arm 25, is a pair of brackets 28 to each of which is secured by means of clips 29, the mid-portion of a spring beam assembly 30, the arrangement being such that the assembly 30 will swing about the trunnion shaft just referred to.

The opposite ends of the spring beam assembly 30 at each side of the frame are utilized to yieldingly resist the rising and falling of the pair of wheels at that side of the vehicle frame. To this end, one end of the spring assembly 30 is connected by means of a pin 31, pivotally mounted in a shackle 32, that is itself pivotally mounted at the end opposite pin 31 for movement about a pin 33 disposed at right angles to pin 31. The pin 33 permits tilting of the axle in vertical planes without imposing twisting stresses upon the spring beam assemblies 30. The pins 33 are suitably mounted in spaced ears 34 carried by split brackets 35, that are clamped to the ends of the axle housing 18, adjacent the wheels carried thereby. Said housing may, if desired, be provided with ball seats permitting the member 35 to have a limited degree of universal movement with respect to the axle housing, such construction further contributing to the flexibility of the construction.

The opposite end of each of the spring beam assemblies 30 is secured by a shackle of ordinary form, designated by the numeral 36, to the arms 25 preferably at a point beyond the connection of the stub axles 26 to said arms. This arrangement provides spring arms to yieldingly resist the swinging movement of the stub axles with respect to the trunnion axis 22, said arm being of greater effective length than the distance of the stub axles from the trunnion axis. It will be understood however, that the shackle 36 may be directly pivoted to the stub axles, if desired.

In the form of the invention shown in Figures 1 and 2 it will be observed that the trunnion 22 is not disposed immediately beneath the center of the spring assembly 30 but that the spring arm extending from said trunnion to the axle housing 18 is shorter than the spring arm extending forwardly and connected to each of the arms 25. This is to distribute the greater portion of the load on the rear end of the frame to the rear axle in order that sufficient load is disposed on the wheels 16 and 17 so that good traction may be secured between the tires carried by said wheels and the road, in order to avoid slipping of the wheels during the driving of the vehicle by the single drive axle provided. The trunnion shaft 22, however, may be disposed at any point along the length of the spring 30 to give the desired distribution of the load on the wheels included in the truck that supports the rear end of the frame.

In order that a further load may be applied to the wheels supporting the drive axle when necessary to increase their traction under abnormal conditions, means are provided to manually lift the forward wheels 14 and 15 thus throwing the load on the wheels 16 and 17. In order that this may be accomplished the end of each of the arms 25 is, preferably, provided with an eye 37 pivotally supporting a clevis 38 to which is attached a cable 39 passing over a pulley 40 mounted on extension frame 11 above the eye 37. The cable 39 is continued forwardly and may be wound upon any suitable drum, that may be provided with suitable lever and ratchet and pawl mechanism, for example, to wind the cable 39 around the drum and raise the wheels 14 or 15 from the ground to shift a part of the load to the rear wheels in case of failure of traction. The arms 25 at both sides of the vehicle are preferably provided with such cables, as have just been described, and the cables on both sides of the frame may be wound on a common drum or they may be made independently adjustable in order that only one of the independently movable wheels 14 or 15 may be suitably raised to meet any conditions that may be encountered which would cause the slipping of one or the other of the wheels 16 or 17.

As the construction shown in Figures 1 and 2 embodies a Hotchkiss drive, it is essential that the torque reactions that tend to rotate the housing 18 about the axes of the wheels carried thereby, be resisted by suitable torque resisting means. Said means, in its preferred form, comprises a pair of spring arms 41 and 42. Each of the arms 41 and 42 is secured adjacent one end thereof to the axle housing 18 preferably below the axes of rotation of the wheels carried thereby. Clips 43 may be utilized for this purpose. The members 41 and 42 are leaf springs and one end of each of said springs is rigidly secured flatwise against the underside of the housing 18. Each of said springs extends forwardly toward the other wheel on the same side of the frame and is curved or bent upwardly, as shown at 44, and then bent into the form of an eye 45 that surrounds the inner end of each of the stub axles 26, being secured on said ends by suitable washers and nuts indicated by the numeral 46, for example.

In the fabrication of the vehicle just described from a standard vehicle having only a pair of wheels supporting one end thereof, the wheels 16 and 17 and the mechanism included within the housing 18 may be of standard form, it being only necessary to add an extension to the drive shaft 19, said extension being necessitated by the added wheel base provided by the addition of the extension frame 11 to the standard chassis frame 10. The spring assemblies 30 may be the ordinary assemblies used in standard single axle vehicles, and the wheels 14 and 15 may be of the same construction as the wheels 16 and 17. It is necessary, only, in order to construct the multi-wheel road vehicle just described, to provide the arms 25, certain special spring mountings and the torque arms 41 and 42, together with the stub axles to which the additional wheels and torque arms are connected. These additional parts are of extremely simple and inexpensive construction, so that it will be appreciated that it will be a relatively simple matter to convert a vehicle of the present standard form into a multi-wheel vehicle. In view of the fact that the wheel 14 is mounted independently of the wheel 15, it follows that a truck is provided to support one end of the frame that has a very high degree of flexibility. It will be noted further that inasmuch as the stub shafts 26 on opposite sides of the frame are not connected together, a space is provided between the ends of said stub shafts or axles through which the drive shaft 19 may pass without interference.

In the form of the invention shown in Figures 3 and 4 the drive axle is disposed forwardly of the trunnion shaft 22. In this form of the invention, the torque reactions on housing 18 are resisted by a torque tube 47 through which extends a live drive shaft 48. The torque tube 47 is rigidly connected to housing 18 at one end and at its other end it is connected to the frame by a universal joint that has its center substantially coincident with the center of a universal joint provided in a live shaft 48, this construction constituting no part of the present invention. In view of the provision of the torque tube 47 the torque resisting arms 41 and 42 utilized in the form of the invention shown in Figures 1 and 2 may be dispensed with.

The leaf spring beam assemblies 30 are connected to the trunnion axis in a manner above described with reference to Figures 1 and 2, being clipped to a bracket that projects downwardly and surrounds the trunnion shaft 22 between the arms 49 and 50 of hollow cast arms 51 to which stub axles 26' are fixed as by a pressed tapered fit adjacent the ends thereof. Each of the spring assemblies 30 at one end thereof is connected by means of a pin 53 to a shackle 52 pivotally mounted to oscillate about the axle housing 18'.

The shackle 52 may alternately be seated on a ball seat formed on the axle housing 18' so as to provide a limited universal movement of the shackle with respect to said housing if desired. The opposite end of each of the spring assemblies 30 is provided with an eye 30' pivotally connected to ears 31' integral with arm 51 by a pin 54 of substantially less diameter than the internal diameter of eye 30' and arm 51 is provided with a depressed seat 51' upon which eye 30' rests and is adapted to slide as permitted by the play between eye 30' and pin 54 for permitting deflection of the respective end of spring beam assembly 30. In this form of the invention, it will be observed, the connection between the end of the spring assembly just referred to and the arm that carries the stub axle on which a non-driven wheel is mounted, is made between the connection of said arm to said stub axle and its pivotal connection to the trunnion 22. It will be understood however, that the arrangement illustrated in Figures 1 and 2, in which the connection is made beyond the stub axle, may be substituted if desired. Inasmuch as the stub axle, the wheel carried thereby and the end of the spring connected to the arm 51 all move about the trunnion 22 as a common axis it will be appreciated that when the wheel carried by the stub axle 26' rises and falls as it moves over road irregularities no substantial strains are imposed upon the arm or the spring asssembly.

In either form of the invention all of the wheels may be supplied with suitable brakes, or if desired, only the driven wheels may be so equipped.

In the operation of this invention power is communicated to the driven axle either by a Hotchkiss drive embodying a live propeller shaft 19 as in Figures 1 and 2, or by a drive illustrated in Figure 3 in which the live propeller shaft is housed within a torque tube 47 that serves to resist the torque reactions imposed upon the housing 18' due to the driving forces. In the latter form of the invention, accordingly, no torque resisting means other than the torque tube is unnecessary. However, in the form of the inventions shown in Figures 1 and 2 the torque reactions are resisted by the spring arms 41 and 42. These arms are flexible so that the provision of such arms interconnecting the wheels on the same side of the vehicle frame do not materially restrict the flexibility of the truck construction, the curve or bend 44 in each of said arms permitting slight separation of the wheels on the same side of the frame due to the deflection of the spring assembly 30, said arms flexing at such times at the bend 44 tending to straighten it and thus permitting such movement. The torque reactions tend to rotate the arms 41 and 42 in a clockwise direction, thus tending to cause the non-driven wheel to be lifted from the ground. This tendency is transmitted from the shackle 36 to one end of the spring assembly 30 causing this end to tend to rise, swinging the spring assembly about its trunnion axis 22. Such swinging movement of the spring beams causes a downward movement of the end of the spring assembly that is connected to the driven axle, thus increasing the load on that drive axle and thereby increasing the traction that may be secured by the wheels carried thereby. Inasmuch as the torque reactions increase in proportion to the fluctuation in the load it follows that when the torque is greatest the torque reactions serve in a maximum degree to automatically shift the load from the non-driven wheels to the driven wheels, thereby assisting in maintaining a non-slipping contact between the tires carried by the driven wheels and the road. If this automatic shifting of the load is insufficient to insure proper traction between the driven wheels and the road the operator of the vehicle may manually raise the non-driven wheels by manipulating the cables 39 as above described. As the vehicle moves forward over uneven roads and as it passes over ridges and depressions that extend completely across the road, the truck construction operates to swing about the trunnion axis 22 permitting the wheels to rise and fall with a minimum effect on the frame. However, when depressions or ridges in the road are disposed so that only the wheels on one side of the vehicle pass thereover, which is the most common condition, it will be observed that the undriven wheels can rise and fall without in any manner affecting the non-driven wheels that are in transverse axial alignment therewith, due to the fact that each of the non-driven wheels is entirely independent of the wheel on the opposite side of the frame. In view of the fact that each of the non-driven wheels is guided by an arm that swings with respect to the trunnion axis of the spring, which resists the swinging movement of said arm, it follows that all connections between said wheels and the frame swing about a common axis so that they are entirely free to move as a unit. This construction thus provides an arrangement of extreme flexibility.

When the vehicle is constructed from a standard vehicle having only a pair of wheels supporting one end, the frame 11 is simply secured in overlapped relation to the standard frame as shown, providing a longer frame. The same drive axle that is used in said standard vehicle is employed in the multi-wheel construction, and the same springs that are used in said vehicle for the purpose of connecting the single axle to the frame are utilized to connect the four wheels to the frame, constituting, in effect, a truck.

Having disclosed specific embodiments of my invention it is to be understood that the same are merely illustrative and not restrictive as the scope of my invention is to be determined from the subjoined claims and not from the foregoing specific disclosure.

What I claim as my invention is:

1. A multi-wheel road vehicle comprising a frame, means providing a pivotal axis extending transversely of said frame, a spring mounted for pivotal movement about said axis at each side of said frame, a drive axle extending transversely of said frame and supporting one end of each of said springs, a pair of drive wheels supporting said axle, an arm at each side of said frame pivoted by said means to swing about said axis adjacent one end and extending away from said axle, a stub axle carried by each arm, a non-driven wheel on each of the stub axles, the other end of each of said springs being supported by one of said stub axles, and torque arms attached to said drive axle and extending to said stub axles, each of said torque arms being flexible in a plurality of directions.

2. A multi-wheel road vehicle comprising a frame, a truck embodying two sets of tandem wheels arranged to support one end of said frame, means provided a pivotal axis extending transversely of said frame, said truck being mounted for pivotal movement about said axis, a drive axle supporting the wheels of one set, the other set of wheels being carried by independently mounted arms arranged to swing about said axis, and torque resisting arms each connected at one end to said drive axle and at its other end to one of said arms in such manner that the torque reactions tend to lift the wheels carried by said arms from the ground whereby the load is shifted to the wheels on said drive axle.

3. A multi-wheel vehicle comprising a frame, a drive axle, a set of driven wheels on said driving axle, a set of idle wheels arranged in close tandem relation to said driving wheels resilient suspension means for supporting one end of said frame upon said driving and idle wheels and for positioning the latter, said suspension means pivoted to said frame about an axis transverse to said frame, a flexible drive shaft to drive said driving axle and means to resist the torque tending to rotate said axle about its longitudinal axis, said means comprising a horizontally arranged leaf spring secured at one end flatwise to said drive axle, means for attaching the other end of said spring to said suspension means at a point located on that side of the transverse axis to which the idle wheels are disposed, the torque reactions being thereby resisted without substantially restricting any desired normal movements of said driving axle permitted by the suspension means.

ROLLIE B. FAGEOL.